(12) United States Patent
Elkady

(10) Patent No.: US 8,527,870 B2
(45) Date of Patent: Sep. 3, 2013

(54) FLEXIBLE ELECTRONIC DOCUMENT THAT RECEIVES DATA INSERTION FROM ONE OR MORE DATA SOURCES

(75) Inventor: Osama Elkady, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1614 days.

(21) Appl. No.: 11/022,162

(22) Filed: Dec. 23, 2004

(65) Prior Publication Data

US 2006/0143556 A1 Jun. 29, 2006

(51) Int. Cl.
*G06F 17/00* (2006.01)

(52) U.S. Cl.
USPC ........... 715/243; 715/234; 715/235; 715/236; 715/239

(58) Field of Classification Search
USPC ......... 715/212–213, 217, 234–236, 238–239, 715/243, 249, 255
See application file for complete search history.

(56) References Cited

U.S. PATENT DOCUMENTS

| | | | | |
|---|---|---|---|---|
| 6,026,433 A * | 2/2000 | D'Arlach et al. | ............. | 709/217 |
| 6,055,522 A * | 4/2000 | Krishna et al. | ................ | 715/205 |
| 6,088,702 A * | 7/2000 | Plantz et al. | ............. | 707/103 R |
| 6,907,564 B1 * | 6/2005 | Burchhardt et al. | .......... | 715/210 |
| 7,370,271 B2 * | 5/2008 | Killen et al. | ................... | 715/212 |
| 7,376,654 B1 * | 5/2008 | Chau et al. | ............................ | 1/1 |
| 7,636,887 B1 * | 12/2009 | Kinnucan, Jr. | ................ | 715/705 |
| 7,703,003 B2 * | 4/2010 | Payne et al. | .................... | 715/234 |
| 2002/0138316 A1 * | 9/2002 | Katz et al. | ........................ | 705/7 |
| 2003/0004993 A1 * | 1/2003 | Templeton et al. | ........... | 707/513 |
| 2003/0014442 A1 * | 1/2003 | Shiigi et al. | .................... | 707/513 |
| 2003/0140311 A1 * | 7/2003 | Lemon et al. | ................ | 715/513 |
| 2004/0128169 A1 * | 7/2004 | Lusen | ............................. | 705/3 |
| 2004/0205465 A1 * | 10/2004 | Baker et al. | ................... | 715/500 |
| 2005/0160359 A1 * | 7/2005 | Falk et al. | ..................... | 715/513 |
| 2006/0048096 A1 * | 3/2006 | Jiang et al. | .................... | 717/115 |
| 2007/0250485 A1 * | 10/2007 | Ushiku | ............................ | 707/3 |
| 2008/0178072 A1 * | 7/2008 | Fiedorowicz et al. | ........ | 715/235 |
| 2008/0278740 A1 * | 11/2008 | Bird et al. | .................... | 358/1.15 |
| 2009/0132384 A1 * | 5/2009 | Duncan et al. | .................. | 705/26 |

OTHER PUBLICATIONS

WO 2004/012109, published Feb. 5, 2004.*
WO 2004/086249, published Oct. 7, 2004.*

* cited by examiner

*Primary Examiner* — Thu Huynh
(74) *Attorney, Agent, or Firm* — Kilpatrick Townsend & Stockton LLP

(57) ABSTRACT

One embodiment in accordance with the invention relates to generating a completed unified data format template that includes data inserted from one or more data sources. Initially, an electronic template can be created using a template application (e.g., Microsoft Word, Microsoft Excel, and the like). The electronic template is embedded with electronic placeholder coding related to data of one or more data sources. The layout of the electronic template can be converted into a unified layout format, wherein the electronic template includes the electronic placeholder coding. The data from the one or more data sources can be applied to the electronic placeholder coding of the unified layout format in order to generate the completed unified data format template.

17 Claims, 5 Drawing Sheets

FLEXIBLE ELECTRONIC DOCUMENT THAT RECEIVES DATA INSERTION FROM ONE OR MORE DATA SOURCES

BACKGROUND

Large companies, corporations, and businesses can be located within different states of the United States of America and even within diverse countries. As such, these type of business organizations may occasionally have to submit divergent kinds of reports with their shareholders, client organizations, intradepartmental groups and organizations, different state and/or country governments. For example, these reports may include tax collection reports, human resource reports, periodic shareholder reports, financial reports, sales performance reports, and the like. Additionally, many of these different reports can involve the inclusion of information stored by one or more database systems.

Typically, one way of including database information within a report is to generate an electronic template of that report designed for insertion of electronic database information. However, there are disadvantages associated with generating this type of electronic template report. One disadvantage is that the generation process usually involves a significant amount of time and effort.

For example, a paper template report is usually first generated by a non-technical person. That paper template report is usually then submitted to a person (or group) that is familiar with the database system, knows how the database will generate the data, and/or the names corresponding to the data within the database. This database person (or an outside vendor) usually exerts a significant amount of time and effort in order to produce an electronic template report that replicates the submitted original. Once completed, the electronic template report may then be returned for review to the person that submitted the original. However, if any corrections or modifications are desired by the submitter, the electronic template report is returned to the database person for further processing. Therefore, the generation process of an electronic template report usually involves a significant amount of time and effort. And these disadvantages becomes even more sever as larger and lager amounts of electronic template reports need to be produced by a large company, corporation, or business.

The present invention may address one or more of the above issues.

SUMMARY

One embodiment in accordance with the invention relates to generating a completed unified data format template that includes data inserted from one or more data sources. Initially, an electronic template can be created using a template application (e.g., Microsoft Word, Microsoft Excel, and the like). The electronic template can be embedded with electronic placeholder coding related to data of one or more data sources. The layout of the electronic template is converted into a unified layout format, wherein the electronic template includes the electronic placeholder coding. The data from the one or more data sources can be applied to the electronic placeholder coding of the unified layout format in order to generate the completed unified data format template.

In yet another embodiment, the present invention provides a computer system. The computer system includes a processor and a bus coupled to the processor. Additionally, the computer system includes a memory device coupled to the bus to communicate with the processor for performing a method. For example, the method can include creating an electronic template using a template application. The method can also include embedding electronic placeholder programming within the electronic template. Furthermore, the method can include converting a layout of the electronic template into a unified layout format, wherein the electronic template includes the electronic placeholder programming. Moreover, the method can include applying data from a data source to the electronic placeholder programming of the unified layout format in order to generate a completed unified data format template.

In still another embodiment, the present invention provides a computer readable medium having computer readable code embodied therein for causing a system to perform a method. For example, the method can include generating an electronic template using a template software application. Electronic placeholder coding can be embedded within the electronic template. A layout of the electronic template (that includes the electronic placeholder coding) can be converted into a unified layout format. Data from a data source can be merged with the electronic placeholder coding of the unified layout format to generate a completed unified data format template.

While particular embodiments of the invention have been specifically described within this summary, it is noted that the invention is not limited to these embodiments. The invention is intended to cover alternatives, modifications and equivalents which may be included within the scope of the invention as defined by the Claims.

DETAILED DESCRIPTION

Figure 1:
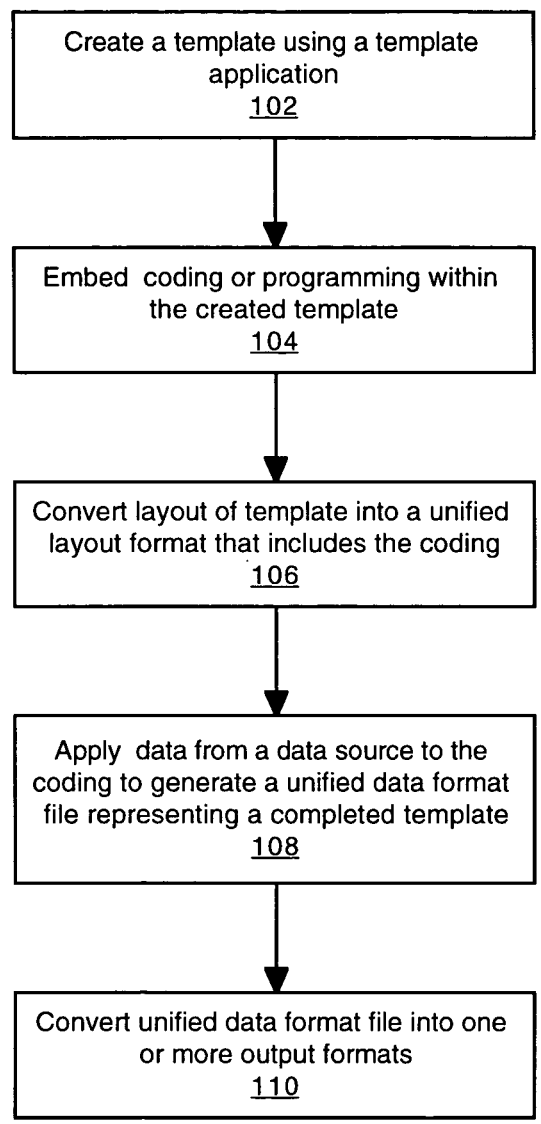
FIG. 1 is a flowchart of an exemplary method in accordance with embodiments of the invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art.

A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals may be referred to as bits, values, elements, symbols, characters, terms, numbers, or the like with reference to the present invention.

Bear in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "mapping", "merging", "binding", "linking", "determining", "transmitting", "receiving", "generating", "creating", "utilizing", "storing" or the like, refer to the action and processes of a computing system, or similar electronic computing device, that manipulates and transforms data. The data is represented as physical (electronic) quantities within the computing system's registers and memories and can be transformed into other data similarly represented as physical quantities within the computing system's memories or registers or other such information storage, transmission, or display devices.

FIG. 1 is a flowchart of a method 100 in accordance with embodiments of the invention for generating a unified data format template that includes data inserted from one or more data sources. Method 100 includes processes of embodiments of the invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in method 100, such operations are exemplary. That is, method 100 may not include all of the operations illustrated by FIG. 1. Alternatively, method 100 may include various other operations and/or variations of the operations shown by FIG. 1. It is noted that the operations of method 100 can each be performed by software, by firmware, by hardware or by any combination thereof.

Specifically, an electronic template can be created or generated using a template application such as, but not limited to, Microsoft® Word or Microsoft Excel. Subsequently, placeholder coding (or programming) that indicates formatting for data that can be inserted from one or more data sources can be embedded within the previously created template. The layout of the template is converted from its originally created formatting into a unified layout format which includes the previous placeholder coding of the template. Data from one or more data sources can be applied (or merged) to the placeholder coding in order to generate a unified data format file that represents a completed template having the same layout and formatting as the originally created document. It is noted that the newly generated completed unified data format file can be in a standard format that can be utilized in a wide variety of ways across diverse computing platforms. As such, the completed electronic unified data format template file may then be viewed, printed out, stored, and/or transmitted to one or more locations.

At operation 102 of FIG. 1, an electronic template can be created or generated using a template application that may include one or more pages. It is noted that the template application at operation 102 may be implemented in a wide variety of ways. For example, the electronic template application can include, but is not limited to, Microsoft Word, Adobe Acrobat, Microsoft® Excel, Word Path, Open Office, K Office for the Linux operating system, API Word, any document application that utilizes the RTF (Rich Text Format) standard, any HTML (Hypertext Markup Language) application, any electronic document application, any electronic spreadsheet application, any electronic template software application, and the like. The creating or generation of the electronic template at operation 102 can be implemented with a computing device similar to, but not limited to, a computer system 500 of FIG. 5. Note that operation 102 enables a computer user (for example) to create a template or document with any type of template or document software application. One of the benefits of that is that the computer user does not need to learn a new and unfamiliar application in order to benefit from method 100.

At operation 104 of FIG. 1, the previously created electronic template can be embedded with electronic placeholder coding or programming, e.g., XSL (eXtensible Stylesheet Language), that indicates formatting for data that subsequently can be inserted from one or more data sources as part of the electronic template. It is appreciated that the electronic placeholder coding embedded within the previously created template can be done in such a manner that it is not visible to (e.g., hidden from) a user viewing the template. In this manner, the appearance of the template having the embedded coding can avoid intimidating those viewers that may not be technically inclined. It is understood that the placeholder coding of operation 104 may be implemented in a wide variety of ways. For example, the placeholder coding or programming may include, but is not limited to, processing instructions, grouping data instructions, sort order instructions, calculation instructions, conditional formatting, sub-totals per pages, and/or the like.

Within process 100, it is noted that the embedding of electronic placeholder coding (or programming) within the electronic template at operation 104 may take place substantially concurrently with the generating (or creating) of the electronic document at operation 102. For example, a template application may be implemented such that it enables a user to embed placeholder coding within an electronic template while its layout and/or content is in the process of being generated (or created). It is appreciated that the functionality of the template application for embedding placeholder coding within an electronic template may be accessible to a user by utilizing one or more graphical user interfaces (GUIs) such as, but not limited to, drop-down menus, pop-up menus, tabular menus, and the like.

At operation 106 of FIG. 1, the electronic layout of the template is converted from its originally created format into an electronic unified (or standardized) layout format which includes the previously embedded placeholder coding of the electronic template. It is understood that the unified layout format can be implemented in a wide variety of ways. For example, the unified layout format can include, but is not limited to, XSL, XSUFO (extensible Stylesheet Language/ Formatting Object), and the like. It is noted that the conversion process at operation 106 is part of transforming the original template into a standardized (or unified) format that can be utilized in a wide variety of ways across diverse computing platforms. Additionally, the conversion process at operation 106 also enables simplification of subsequent merging of data from one or more data sources with the unified layout format template since both can involve similar technology.

At operation 108, electronic data from one or more data sources can be applied to (or merged with) the placeholder coding in order to generate an electronic unified data format file representing a completed (or filled out) template having the same layout and formatting as the originally created electronic template. It is understood that the data at operation 108 may be implemented in any data format. For example, the electronic data may be implemented as, but is not limited to, extensible Markup Language (XML) data, or in any other data format. It is appreciated that a data source at operation 108 can be implemented in a wide variety of ways. For example, a data source can be implemented as, but is not limited to, a database, a computing device, a server, or any type of electronic data source. Operation 108 can be implemented to accept data in many different formats from one or more data sources. If the data from one or more data sources are in different formats or are not in a desired data format, operation 108 can include the conversion of the data into a unified data format (e.g., XML format, or any other data format) before being applied to (or merged with) the placeholder coding to generate the electronic unified data format file.

At operation 110 of FIG. 1, the electronic unified data format file representing a completed (or filled out) template or document can then be converted into one or more output formats. Note that operation 110 can be implemented in a wide variety of ways. For example, the electronic unified data format file can be converted into an output format such as, but not limited to, PDF, HTML, RTF, Microsoft Excel, Microsoft Word, or any other template or document format.

It is noted that the newly generated electronic unified data format file of process 100 can be in a standard format that can be utilized in diverse ways across a wide variety of computing platforms. Therefore, the completed electronic unified data format file template may then be viewed, printed out, stored, and/or transmitted to one or more locations. Furthermore, by converting the data and template into a unified data format, it provides greater flexibility in shaping the output to the end user's desired format (e.g., PDF, HTML, RTF, Microsoft Excel, Microsoft Word, and the like).

Figure 2:
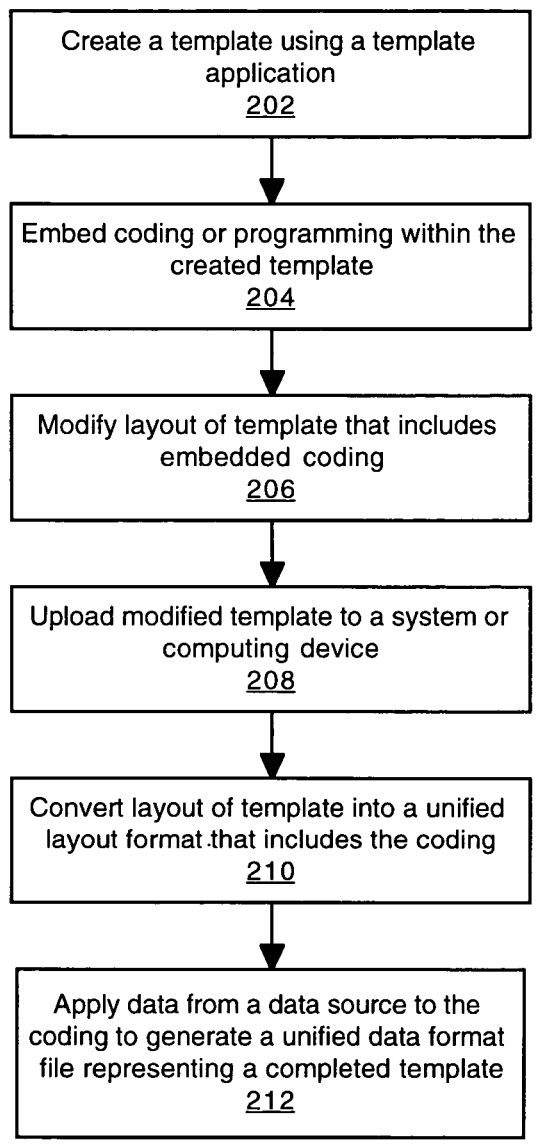
FIG. 2 is a flowchart of another exemplary method in accordance with embodiments of the invention.

FIG. 2 is a flowchart of a method 200 in accordance with embodiments of the invention for generating a unified data format template that includes data inserted from one or more data sources. Method 200 includes processes of embodiments of the invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in method 200, such operations are exemplary. That is, method 200 may not include all of the operations illustrated by FIG. 2. Alternatively, method 200 may include various other operations and/or variations of the operations shown by FIG. 2. It is noted that the operations of method 200 can each be performed by software, by firmware, by hardware or by any combination thereof.

Specifically, an electronic template can be created or generated using a template application such as, but not limited to, Microsoft Excel or Microsoft Word. Later, electronic placeholder coding (or programming) that indicates formatting for data that can be inserted from one or more data sources can be embedded within the previously generated template. The layout of the template (that includes the embedded placeholder coding) can then be modified or changed. The modified electronic template can then be uploaded (or transmitted) to a system. The layout of the received template is then converted from its current formatting into a unified layout format which includes the previous placeholder coding of the template. Data from one or more data sources can be applied (or merged) with the placeholder coding to generate a unified data format file representing a completed (or filled out) template having the same layout and formatting as the uploaded template. The newly generated unified data format file can be a standardized format which can be utilized in diverse ways across a wide variety of computing platforms. As such, the completed electronic unified data format file template may then be viewed, printed out, stored, and/or transmitted to one or more locations.

At operation 202 of FIG. 2, an electronic template can be created or generated using a template application that may include one or more pages. It is noted that the template application at operation 202 may be implemented in a wide variety of ways. For example, the template application can be implemented in any manner similar to that described herein, but is not limited to such. It is appreciated that the creating (or generating) of the electronic template at operation 202 can be implemented with a computing device similar to, but not limited to, computer system 500 of FIG. 5. Note that operation 202 enables a computer user (for example) to create a template or document with any type of template or document software application. One of the benefits is that the computer user does not need to learn a new and unfamiliar application in order to benefit from method 200.

At operation 204, the previously created electronic template can be embedded with electronic placeholder coding or programming (e.g., XSL) that indicates formatting for data that subsequently can be inserted from one or more data sources as part of the electronic template. It is understood that operation 204 can be implemented in a wide variety of ways. For example, operation 204 can be implemented in any manner similar to that described herein, but is not limited to such.

Within process 200, it is noted that the embedding of electronic placeholder coding within the electronic template at operation 204 may take place substantially concurrent with the generating (or creating) of the electronic template at operation 202. Within one embodiment in accordance with the invention, a template application may be implemented such that it allows a user to embed placeholder coding within an electronic template while its layout and/or content is in the process of being generated (or created). Within this embodiment, the functionality of the template application for embedding placeholder coding within an electronic template may be accessible to a user by utilizing one or more GUIs such as, but not limited to, drop-down menus, pop-up menus, tabular menus, and the like.

At operation 206 of FIG. 2, the layout of the template (that was embedded with placeholder coding) can be modified or changed utilizing, but not limited to, the template application that originally created the template. It is noted that the modification of the template layout at operation 206 can be implemented in a wide variety of ways. For example, elements of the template layout that can be modified or changed may include, but is not limited to, font, spacing, color, font size, borders, background, graphics, and/or the like.

At operation 208, the modified electronic template can then be uploaded (or transmitted) to a system or computing device. It is understood that operation 208 can be implemented in diverse ways. For example, the modified electronic template can be uploaded (or transmitted) to the system at operation 208 by a computing device communicatively coupled with the system (or computing device). The transmitting computing device may be communicatively coupled with the system via wired and/or wireless communication technology. Furthermore, the wired and/or wireless communication technology may involve one or more communication networks.

At operation 210 of FIG. 2, the electronic layout of the uploaded template can be converted from its current format into an electronic unified (or standardized) layout format which includes the previously embedded placeholder coding of the template. It is understood that operation 210 can be implemented in any manner similar to that described herein, but is not limited to such.

At operation 212, electronic data from one or more data sources can be applied to (or merged with) the placeholder coding in order to generate an electronic unified data format file representing a completed (or filled out) template having the same layout and formatting as the uploaded electronic template. It is appreciated that operation 212 can be implemented in any manner similar to that described herein, but is not limited to such.

It is noted that the newly generated electronic unified data format file of process 200 can be in a standardized format which can be utilized in diverse ways across a wide variety of computing platforms. As such, the completed electronic unified data format template file may then be viewed, printed out, stored, and/or transmitted to one or more locations.

Figure 3:
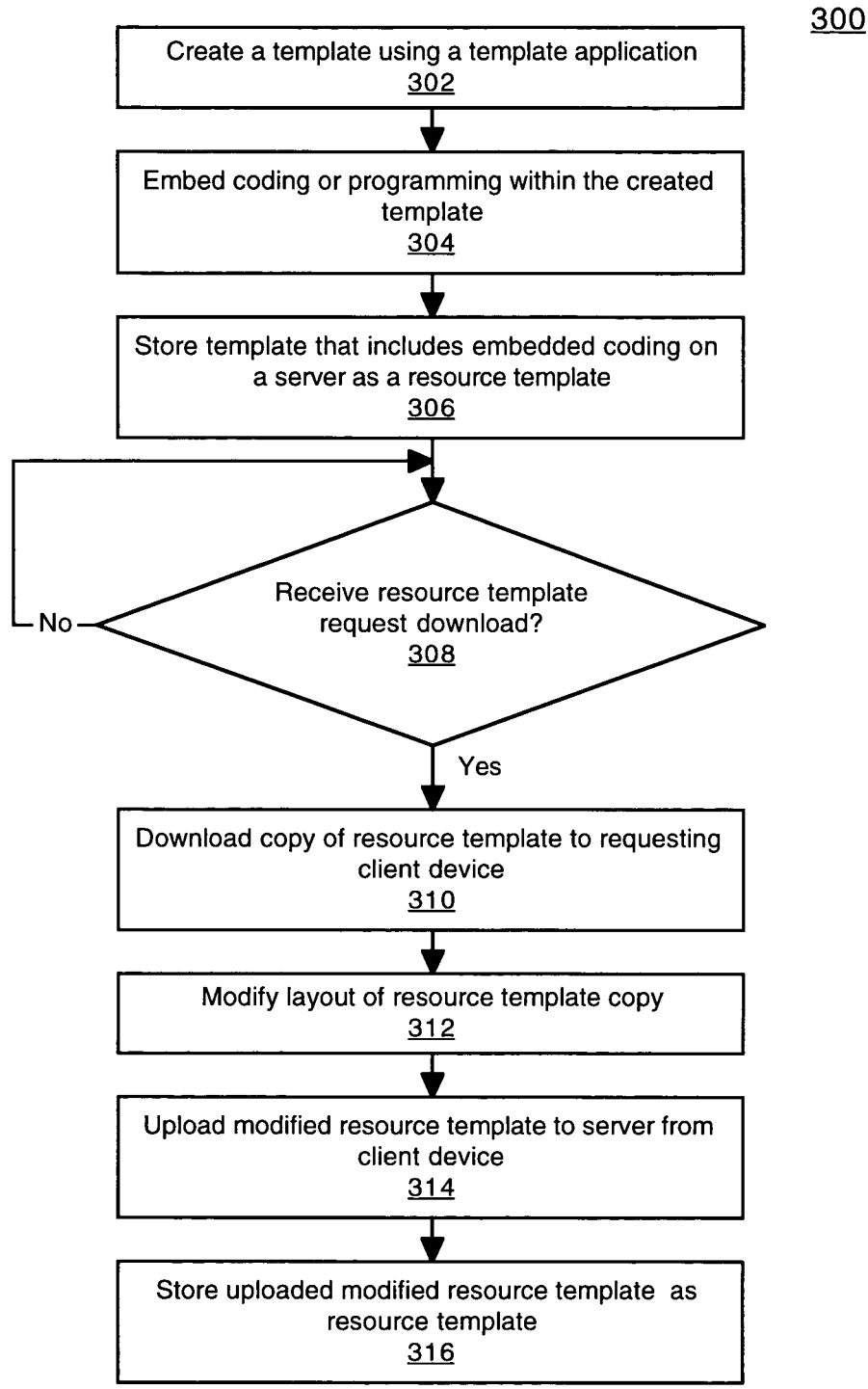
FIG. 3 is a flowchart of yet another exemplary method in accordance with embodiments of the invention.

FIG. 3 is a flowchart of a method 300 in accordance with embodiments of the invention for generating an electronic template. Method 300 includes processes of embodiments of the present invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in method 300, such operations are exemplary. That is, method 300 may not include all of the operations illustrated by FIG. 3. Alternatively, method 300 may include various other operations and/or variations of the operations recited in FIG. 3. It is noted that the operations of method 300 can each be performed by software, by firmware, by hardware or by any combination thereof.

Specifically, an electronic template can be created or generated using a template application such as, but not limited to, Microsoft Excel or Microsoft Word. Electronic placeholder coding that indicates formatting for data that can be inserted from one or more data sources may be embedded within the previously generated template. The electronic template that includes the embedded placeholder coding can then be stored as a resource template by a server. A determination can be made as to whether a download request for the stored resource template has been received from a client device. If not, the download request determination can be continually performed. However, if a download request is received, a copy of the resource template can be downloaded to the client device that transmitted the download request. The layout of the resource template (that includes the embedded placeholder coding) can then be modified or changed as desired. The modified electronic resource template can then be uploaded (or transferred) to the server where it can then be stored. It is noted that the modified resource template can be stored by the server as an additional resource template or it can be stored such that it replaces the previous resource template.

At operation 302 of FIG. 3, an electronic template can be created or generated using a template application that may include one or more pages. It is understood that the template application at operation 302 may be implemented in a wide variety of ways. For example, the template application can be implemented in any manner similar to that described herein, but is not limited to such. It is appreciated that the creating (or generating) of the electronic template at operation 302 of FIG. 3 can be implemented with a computing device similar to, but not limited to, computer system 500 of FIG. 5. Note that operation 302 enables a computer user (for example) to create a template or document with any type of template or document software application. One of the benefits is that the computer user does not need to learn a new and unfamiliar application in order to benefit from method 300.

At operation 304, the previously created electronic template can be embedded with electronic placeholder coding (e.g., XSL) indicating formatting for data that can be inserted from a data source as part of the electronic template. It is understood that operation 304 can be implemented in a wide variety of ways. For example, operation 304 can be implemented in any manner similar to that described herein, but is not limited to such.

Within process 300, it is understood that the embedding of electronic placeholder coding within the electronic template at operation 304 may occur substantially concurrent with the creating (or generating) of the electronic template at operation 302. Within one embodiment, a template application may be implemented such that it allows a user to embed placeholder coding within an electronic template while its layout and/or content is currently being generated (or created). Within this embodiment, the functionality of the template application for embedding placeholder coding within an electronic template may be accessible to a user by utilizing one or more GUIs such as, but not limited to, drop-down menus, pop-up menus, tabular menus, and the like.

At operation 306 of FIG. 3, the electronic template that includes the embedded placeholder coding can then be stored by a server (or computing device) as a resource template for subsequent use. It is appreciated that operation 306 can be implemented in diverse ways in accordance with the present embodiment. For example, the electronic embedded resource template can be stored by, but is not limited to, one or more memory devices, one or more servers, one or more computer systems, one or more database systems, and/or one or more data sources.

At operation 308, a determination can be made as to whether a download request for the stored resource template has been received from a client device. If a download request has not been received at operation 308, process 300 proceeds to the beginning of operation 308. However, if a download request for the stored resource template has been received from a client device, process 300 proceeds to operation 310. It is understood that the reception of the download request at operation 308 can be implemented in diverse ways. For example, the client device may be communicatively coupled to the server (or computing device) thereby enabling the transmission of the download request. Within one embodiment, the client device can be coupled to the server via wired and/or wireless communication technology. Moreover, the wired and/or wireless communication technology may makeup one or more communication networks.

At operation 310 of FIG. 3, a copy of the stored resource template can be downloaded (or transmitted) to the requesting client device that transmitted (or sent) the download request. The downloading at operation 310 of the resource template copy to the client device can be implemented in a wide variety of ways. For example, the downloading could occur utilizing wired and/or wireless communication technology.

At operation 312, the layout of the resource template copy can be modified or altered utilizing, but not limited to, a template application compatible with the one originally used to created the electronic template at operation 302. It is appreciated that the modification of the resource template layout at operation 312 can be implemented in a wide variety of ways. For example, elements of the resource template layout that can be modified or changed may include, but is not limited to, font, spacing, color, font size, borders, background, graphics, and/or the like.

At operation 314 of FIG. 3, the modified electronic resource template can then be uploaded (or transferred) to the server (or computing device) from the client device. It is noted that operation 314 can be implemented in a wide variety of ways. For example, the modified electronic resource template can be uploaded (or transmitted) to the server by the client device at operation 204 via wired and/or wireless communication technology.

At operation 316, the uploaded modified electronic resource template (that includes the embedded placeholder coding) can then be stored by the server as a resource template for subsequent use. It is noted that the modified resource template can be stored by the server (or computing device) as an additional resource template for subsequent use. Alternatively, the modified resource template can be stored by the server (or computing device) such that it replaces the previous resource template. Operation 316 can be implemented in a wide variety of ways. For example, the uploaded modified electronic resource template can be stored by, but is not limited to, one or more memory devices, one or more servers, one or more computer systems, one or more database systems, and/or one or more data sources.

It is noted that process 300 of FIG. 3 can be modified to include other operations. For example, operations 210 and/or 212 may be included as part of process 300. As such, the electronic layout of the uploaded modified electronic resource template can be converted from its current format into an electronic unified (or standardized) data format which includes the previously embedded placeholder coding of the template in any manner similar to operation 210 described herein, but not limited to such. Furthermore, electronic data from one or more data sources can be applied to (or merged with) the placeholder coding in order to generate an electronic unified data format file representing a completed (or filled out) template having the same layout and formatting as the uploaded modified electronic resource template in any manner similar to that described herein, but not limited to such. It is noted that this newly generated electronic unified data format template file of process 300 can be in a standardized format which can be utilized in diverse ways across a wide variety of computing platforms. As such, the completed electronic unified data format template file may then be viewed, printed out, stored, and/or transmitted to one or more locations.

Figure 4:
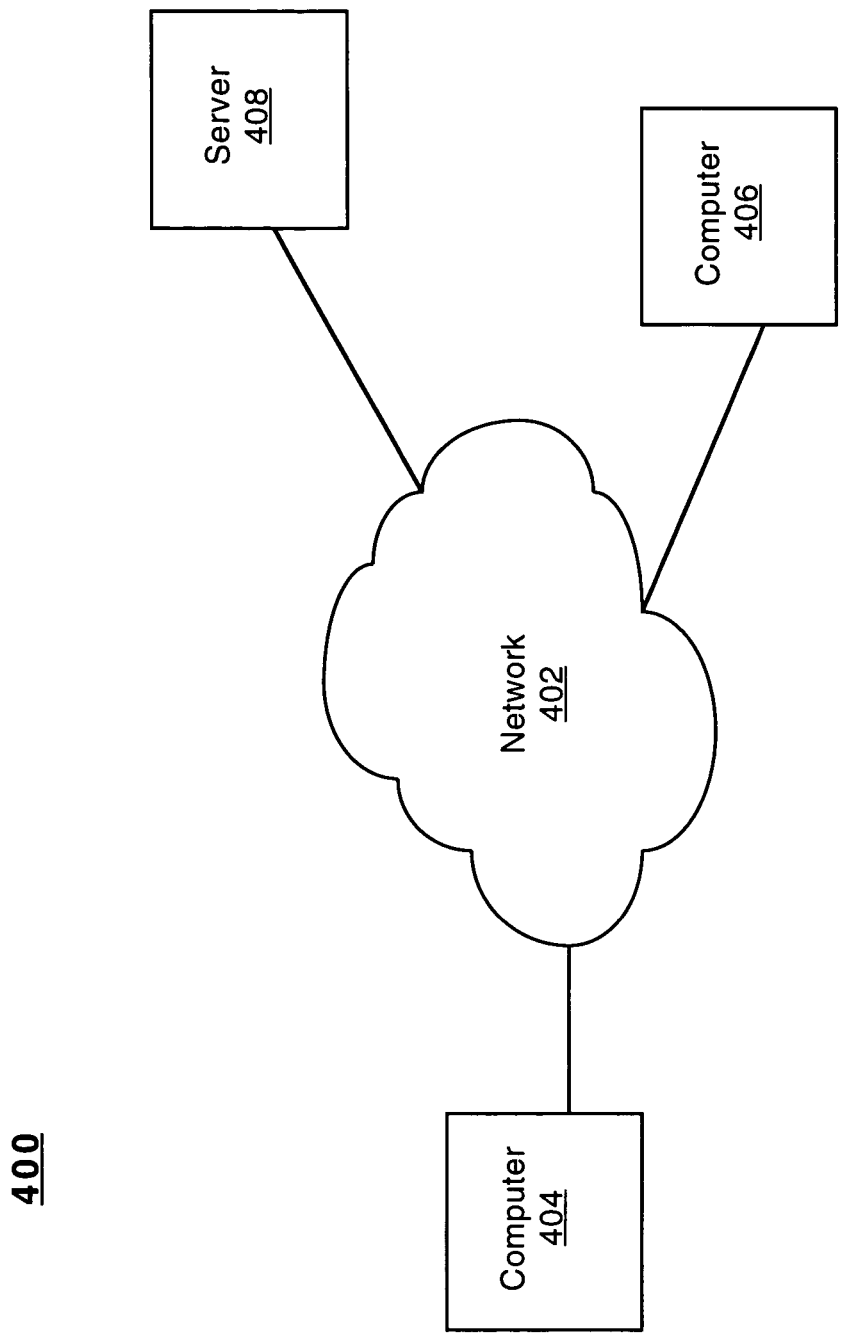
FIG. 4 is a block diagram of an exemplary network in accordance with embodiments of the invention.

FIG. 4 is a block diagram of an exemplary network 400 in accordance with embodiments of the invention. For example, computers 404 and 406 may each be utilized to create (or generate) one or more electronic templates. Additionally, computers 404 and 406 may each be utilized to upload or download electronic templates with a server 408 via a network 402. It is understood that computer 404, server 408, and/or computer 406 may perform in accordance with one or more embodiments (e.g., methods 100, 200, and/or 300) of the invention.

Within networking environment 400, server 408 and computers 404 and 406 may be coupled in order to communicate. Specifically, server 408 and computers 404 and 406 are communicatively coupled to network 402. It is appreciated that server 408 and computers 404 and 406 may each be communicatively coupled to network 402 via wired and/or wireless communication technologies.

The network 402 of networking environment 400 may be implemented in a wide variety of ways. For example, network 402 may be implemented as, but is not limited to, a local area network (LAN), a metropolitan area network (MAN), a wide area network (WAN), and/or the Internet. It is noted that networking environment 400 is well suited to be implemented without network 402. As such, server 408 and computers 404 and 406 may be communicatively coupled via wired and/or wireless communication technologies.

Within FIG. 4, it is understood that networking environment 400 may be implemented to include greater or fewer number of computers than the two computers (e.g., 404 and 406) shown. Additionally, networking environment 400 may be implemented to include a greater number of server devices than the one server device (e.g., 408) shown. It is noted that server 408 and computers 404 and 406 may each be implemented in a manner similar to computer system 500 of FIG. 5, described herein. However, these devices of networking environment 400 are not in any way limited to such an implementation.

Figure 5:
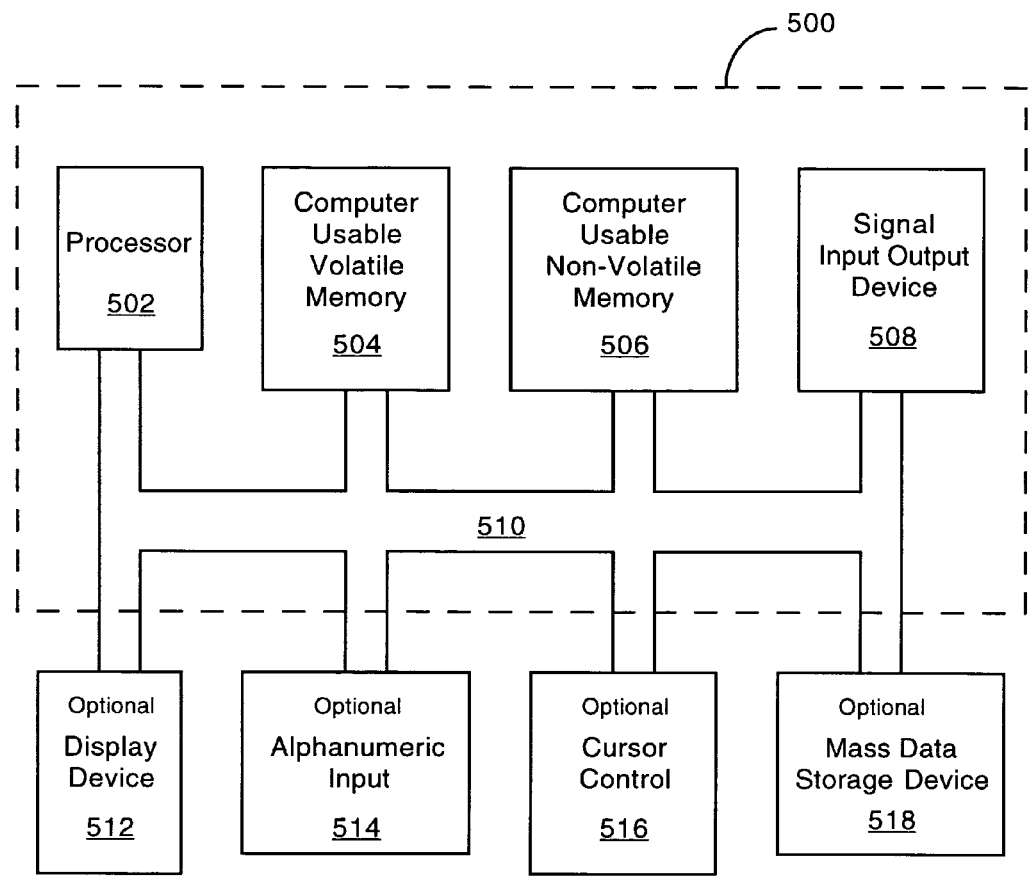
FIG. 5 is a block diagram of an exemplary computer system in accordance with embodiments of the invention.

FIG. 5 is a block diagram of an exemplary computer system 500 in accordance with embodiments of the invention. It is understood that system 500 is not strictly limited to be a computer system. As such, system 500 is well suited to be any type of computing device (e.g., server computer, desktop computer, laptop computer, portable computing device, data source computer, etc.). Within the discussions of embodiments in accordance with the invention herein, certain processes and operations were discussed that may be realized, in some embodiments, as a series of instructions (e.g., software program) that reside within computer readable memory of computer system 500 and executed by a processor(s) of system 500. When executed, the instructions can cause computer system 500 to perform specific operations and exhibit specific behavior which are described herein.

Computer system 500 includes an address/data bus 510 for communicating information, one or more central processors 502 coupled with bus 510 for processing information and instructions. Central processor unit(s) 502 may be a microprocessor or any other type of processor. The computer 500 also includes data storage features such as computer usable volatile memory 504, e.g., random access memory (RAM), static RAM, dynamic RAM, etc., coupled with bus 510 for storing information and instructions for central processor(s) 502, computer usable non-volatile memory 506, e.g., read only memory (ROM), programmable ROM, flash memory, erasable programmable read only memory (EPROM), electrically erasable programmable read only memory (EEPROM), etc., coupled with bus 510 for storing static information and instructions for processor(s) 502.

System 500 of FIG. 5 also includes one or more signal generating and receiving devices 508 coupled with bus 510 for enabling system 500 to interface with other electronic devices. The communication interface(s) 508 may include wired and/or wireless communication technology. For example, in one embodiment of the present invention, the communication interface 508 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case the communication interface(s) 508 may include a cable modem or a DSL modem.

Optionally, computer system 500 can include an alphanumeric input device 514 including alphanumeric and function keys coupled to the bus 510 for communicating information and command selections to the central processor(s) 502. The computer 500 can also include an optional cursor control or cursor directing device 516 coupled to the bus 510 for communicating user input information and command selections to the processor(s) 502. The cursor directing device 516 can be implemented using a number of well known devices such as, but not limited to, a mouse, a track ball, a track pad, an optical tracking device, a touch screen, etc. Alternatively, it is appreciated that a cursor can be directed and/or activated via input from the alphanumeric input device 514 using special keys and key sequence commands. The present embodiment is also well suited to directing a cursor by other means such as, for example, voice commands.

The system 500 of FIG. 5 can also include an optional computer usable mass data storage device 518 such as a magnetic or optical disk and disk drive (e.g., hard drive or floppy diskette) coupled with bus 510 for storing information and instructions. An optional display device 512 is coupled to bus 510 of system 500 for displaying video and/or graphics. It should be appreciated that optional display device 512 may be a cathode ray tube (CRT), flat panel liquid crystal display (LCD), field emission display (FED), plasma display or any other display device suitable for displaying video and/or graphic images and alphanumeric characters recognizable to a user.

It is noted that the components associated with system 500 described above may be resident to and associated with one physical computing device. However, one or more of the components associated with system 500 may be physically distributed to other locations and be communicatively coupled together (e.g., via a network).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
creating a first electronic template using a template application, the first electronic template having an initial layout format;
embedding electronic placeholder coding within said first electronic template, wherein:
the electronic placeholder coding indicates formatting for a data set, wherein the data set can be inserted from one or more data sources; and
the electronic placeholder coding is not visible when viewing the first electronic template;
downloading a copy of said first electronic template that includes said electronic placeholder coding;
modifying a layout of said copy of said first electronic template that includes said electronic placeholder coding;
uploading said copy of said first electronic template that includes a modified layout;
storing as the first electronic template said copy of said first electronic template that includes said modified layout;
converting the first electronic template that includes said modified layout into a second electronic template having a unified layout format and a different file type than the initial layout format, wherein said converted second electronic template includes said electronic placeholder coding;
merging formatting data from a formatting data source to replace said electronic placeholder coding of said second electronic template having a unified layout format to generate a third electronic template that is a completed unified data template, wherein the formatting data from the formatting data source is Markup Language (XML) data; and
converting said completed unified data template into an output format by merging the completed unified data template with the data set from the one or more data sources, wherein the output format is different than the format of the completed unified data template.

2. The method as described in claim 1, wherein said electronic placeholder coding comprises grouping formatting for said data.

3. The method as described in claim 1, wherein said electronic placeholder coding comprises conditional formatting for said data.

4. The method as described in claim 1, wherein said electronic placeholder coding is sort order formatting for said data, processing instructions for said data, or calculation instructions for said data.

5. The method as described in claim 1, further comprising:
grouping said unified layout format with said electronic placeholder coding.

6. The method as described in claim 1, wherein said template application comprises a document software application.

7. The method as described in claim 1, wherein said template application is selected from the group consisting of: a spreadsheet software application, a Hypertext Markup Language (HTML) software application, and an electronic document software application.

8. The method of claim 1, wherein the uniform layout format is a standardized format.

9. The method of claim 8, wherein the uniform layout format is implemented in at least one of XSL and XSL/FO.

10. The method of claim 1, wherein the output format has a different file type than the completed unified data template and a different file type than the initial layout format.

11. The method of claim 1, wherein said template application comprises a spreadsheet software application.

12. The method of claim 1, wherein said template application comprises an electronic document software application.

13. A computer system comprising:
a processor;
a bus coupled to said processor; and
a memory device coupled to said bus to communicate with said processor for performing a method comprising:
creating a first electronic template using a template application, the first electronic template having an initial layout format;
embedding electronic placeholder coding within said first electronic template, wherein:
the electronic placeholder coding indicates formatting for a data set, wherein the data set can be inserted from one or more data sources; and
the electronic placeholder coding is not visible when viewing the first electronic template;
downloading a copy of said first electronic template that includes said electronic placeholder coding;
modifying a layout of said copy of said first electronic template that includes said electronic placeholder coding;
uploading said copy of said first electronic template that includes a modified layout;
storing as the first electronic template said copy of said first electronic template that includes said modified layout;
converting the first electronic template that includes said modified layout into a second electronic template having a unified layout format and a different file type than the initial layout format, wherein said converted second electronic template includes said electronic placeholder coding;
merging formatting data from a formatting data source to replace said electronic placeholder coding of said second electronic template having a unified layout format to generate a third electronic template that is a completed unified data template, wherein the formatting data from the formatting data source is Markup Language (XML) data; and
converting said completed unified data template into an output format by merging the completed unified data template with the data set from the one or more data sources, wherein the output format is different than the format of the completed unified data template.

14. The computer system of claim 13, said method further comprising:
storing said electronic template that includes said electronic placeholder programming as a resource electronic template.

15. The computer system of claim 13, wherein said electronic placeholder programming comprises grouping formatting for said data.

16. The computer system of claim 13, wherein said electronic placeholder programming comprises conditional formatting for said data.

17. A non-transitory computer readable medium having computer readable code embodied therein for causing a system to perform a method comprising:
generating a first electronic template using a template software application, the first electronic template having an initial layout format;
embedding electronic placeholder coding within said first electronic template, wherein:
the electronic placeholder coding indicates formatting for a data set, wherein the data set can be inserted from one or more data sources; and
the electronic placeholder coding is not visible when viewing the first electronic template;
downloading a copy of said first electronic template that includes said electronic placeholder coding;
modifying a layout of said copy of said first electronic template that includes said electronic placeholder coding;
uploading said copy of said first electronic template that includes a modified layout;
storing as the first electronic template said copy of said first electronic template that includes said modified layout;
converting the first electronic template that includes said modified layout into a second electronic template having a unified layout format and a different file type than the initial layout format, wherein said converted second electronic template includes said electronic placeholder coding;
merging formatting data from a formatting data source to replace said electronic placeholder coding of said second electronic template having a unified layout format to generate a third electronic template that is a completed unified data template, wherein the formatting data from the formatting data source is Markup Language (XML) data; and
converting said completed unified data template into an output format by merging the completed unified data template with the data set from the one or more data sources, wherein the output format is different than the format of the completed unified data template.

* * * * *

UNITED STATES PATENT AND TRADEMARK OFFICE
CERTIFICATE OF CORRECTION

PATENT NO. : 8,527,870 B2  
APPLICATION NO. : 11/022162  
DATED : September 3, 2013  
INVENTOR(S) : Elkady Page 1 of 1

It is certified that error appears in the above-identified patent and that said Letters Patent is hereby corrected as shown below:

In the Specifications

In column 1, line 42, delete "lager" and insert -- larger --, therefor.

In column 4, line 64, delete "(extensible" and insert -- (eXtensible --, therefor.

In column 5, line 16, delete "extensible" an insert -- eXtensible --, therefor.

Signed and Sealed this  
Seventeenth Day of December, 2013

Margaret A. Focarino  
*Commissioner for Patents of the United States Patent and Trademark Office*